United States Patent
Eitan et al.

(10) Patent No.: US 10,432,279 B2
(45) Date of Patent: Oct. 1, 2019

(54) LONG BEAMFORMING TRAINING FIELD SEQUENCES

(71) Applicant: QUALCOMM Incorporated, San Diego, CA (US)

(72) Inventors: Alecsander Petru Eitan, Haifa (IL); Assaf Yaakov Kasher, Haifa (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 15/857,412

(22) Filed: Dec. 28, 2017

(65) Prior Publication Data

US 2018/0191419 A1    Jul. 5, 2018

Related U.S. Application Data

(60) Provisional application No. 62/442,730, filed on Jan. 5, 2017, provisional application No. 62/441,553, filed on Jan. 2, 2017.

(51) Int. Cl.
| | |
|---|---|
| *H04B 7/06* | (2006.01) |
| *H04W 72/04* | (2009.01) |
| *H04W 16/28* | (2009.01) |
| *H04B 7/0426* | (2017.01) |
| *H04B 7/08* | (2006.01) |

(52) U.S. Cl.
CPC .......... *H04B 7/0617* (2013.01); *H04B 7/043* (2013.01); *H04B 7/0632* (2013.01); *H04B 7/0695* (2013.01); *H04B 7/0851* (2013.01); *H04W 16/28* (2013.01); *H04W 72/0446* (2013.01)

(58) Field of Classification Search
CPC ........ H04W 80/04; H04W 8/26; H04L 12/56; H04L 2012/56; H04L 1/0007; H04L 47/36; H04J 3/07; H04J 3/073; H04J 3/076; H04B 1/50; H04B 1/56
USPC ................ 370/349, 389, 506, 473, 470, 339
See application file for complete search history.

(56) References Cited

U.S. PATENT DOCUMENTS

| | | | |
|---|---|---|---|
| 2016/0323755 A1* | 11/2016 | Cordeiro | H04J 13/0014 |
| 2017/0324461 A1* | 11/2017 | Lomayev | H04B 7/0634 |
| 2018/0262366 A1* | 9/2018 | Sahin | H04B 7/0452 |

OTHER PUBLICATIONS

Assaf Kasher (QUALCOMM): "Short-and-Long-TRN-Sequences," IEEE Draft; 11-17-0430-00-00AY-Short-And-Long-TRN-Sequences, IEEE-SA Mentor, Piscataway, NJ, USA, vol. 882.11ay, Mar. 13, 2017 (Mar. 13, 2017), XP068115545, Retrieved from the Internet: URL: https://mentor.ieee.org/802.11/dcn/17/11-17-0430-00-00ay-short-and-long-trn-sequences.docx, pp. 1-6, [retrieved on Mar. 13, 2017].

(Continued)

*Primary Examiner* — Brenda H Pham
(74) *Attorney, Agent, or Firm* — Steven R. Thiel

(57) ABSTRACT

Certain aspects of the present disclosure provide methods and apparatus for using frames having beamforming training fields with base complementary code sequences that have a longer length than complementary code sequences used in other fields of the frame. The longer length may help perform channel estimation when encountering longer delay spread, for example, due to multipath effects of multiple beams during a beamforming training procedure. The longer length may be based on a lengthening factor which may be signaled, for example, using on or more bits of a preamble portion of the frames.

15 Claims, 6 Drawing Sheets

(56) References Cited

OTHER PUBLICATIONS

Cordeiro C., "Specification Framework for TGay ; 11-15-1358-08-00ay-specification-framework-for-tgay", IEEE Draft; vol. 802.11 ay, No. 8, Nov. 23, 2016, XP068110625, Retrieved from the Internet: URL:https://mentor.ieee.org/802.11/dcn/15/11-15-1358-08-00ay-specification-framework-for-tgay.doc, pp. 1-89.
International Search Report and Written Opinion—PCT/US2017/068946—ISA/EPO—dated Mar. 29, 2018.

\* cited by examiner

Example Sequcne Lengths for CB=1

| Bit Values | Lengthening Factor | TRN Field Base Golay Sequence Length |
|---|---|---|
| 00 | x1 | 128 |
| 01 | x2 | 256 |
| 10 | x4 | 512 |

FIG. 6A

Example Sequcne Lengths for CB=2

| Bit Values | Lengthening Factor | TRN Field Base Golay Sequence Length |
|---|---|---|
| 00 | x1 | 256 |
| 01 | x2 | 512 |
| 10 | x4 | 1024 |

FIG. 6B

Example Sequcne Lengths for CB=3

| Bit Values | Lengthening Factor | TRN Field Base Golay Sequence Length |
|---|---|---|
| 00 | x1 | 384 |
| 01 | x2 | 768 |
| 10 | x4 | 1536 |

FIG. 6C

Example Sequcne Lengths for CB=4

| Bit Values | Lengthening Factor | TRN Field Base Golay Sequence Length |
|---|---|---|
| 00 | x1 | 512 |
| 01 | x2 | 1024 |
| 10 | x4 | 2048 |

FIG. 6D

LONG BEAMFORMING TRAINING FIELD SEQUENCES

CLAIM OF PRIORITY UNDER 35 U.S.C. § 119

The present Application for Patent claims benefit of U.S. Provisional Patent Application Ser. No. 62/441,553, filed Jan. 2, 2017 and U.S. Provisional Patent Application Ser. No. 62/442,730, filed Jan. 5, 2017, assigned to the assignee hereof and hereby expressly incorporated by reference herein.

BACKGROUND

Field of the Disclosure

Certain aspects of the present disclosure generally relate to wireless communications and, more particularly, to utilizing long complementary code sequences, for example, for use in constructing beamforming training fields.

Description of Related Art

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate a frame comprising at least one beamforming training field having one or more repetitions of one or more base complementary sequences and one or more bits providing an indication of a length of one of the base complementary sequences relative to a reference sequence length; and an interface configured to output the frame for transmission.

Certain aspects of the present disclosure provide an apparatus for wireless communications. The apparatus generally includes an interface for obtain a frame having a preamble portion comprising at least one beamforming training field having one or more repetitions of one or more base complementary sequences and one or more bits providing an indication of a length of one of the base complementary sequences relative to a reference sequence length; and a processing system configured to determine the length based on the one or more bits and process the at least one beamforming training field based on the determination.

Aspects of the present disclosure generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 6A-6D illustrate example lengthening factors for different channel bonding values, in accordance with certain aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
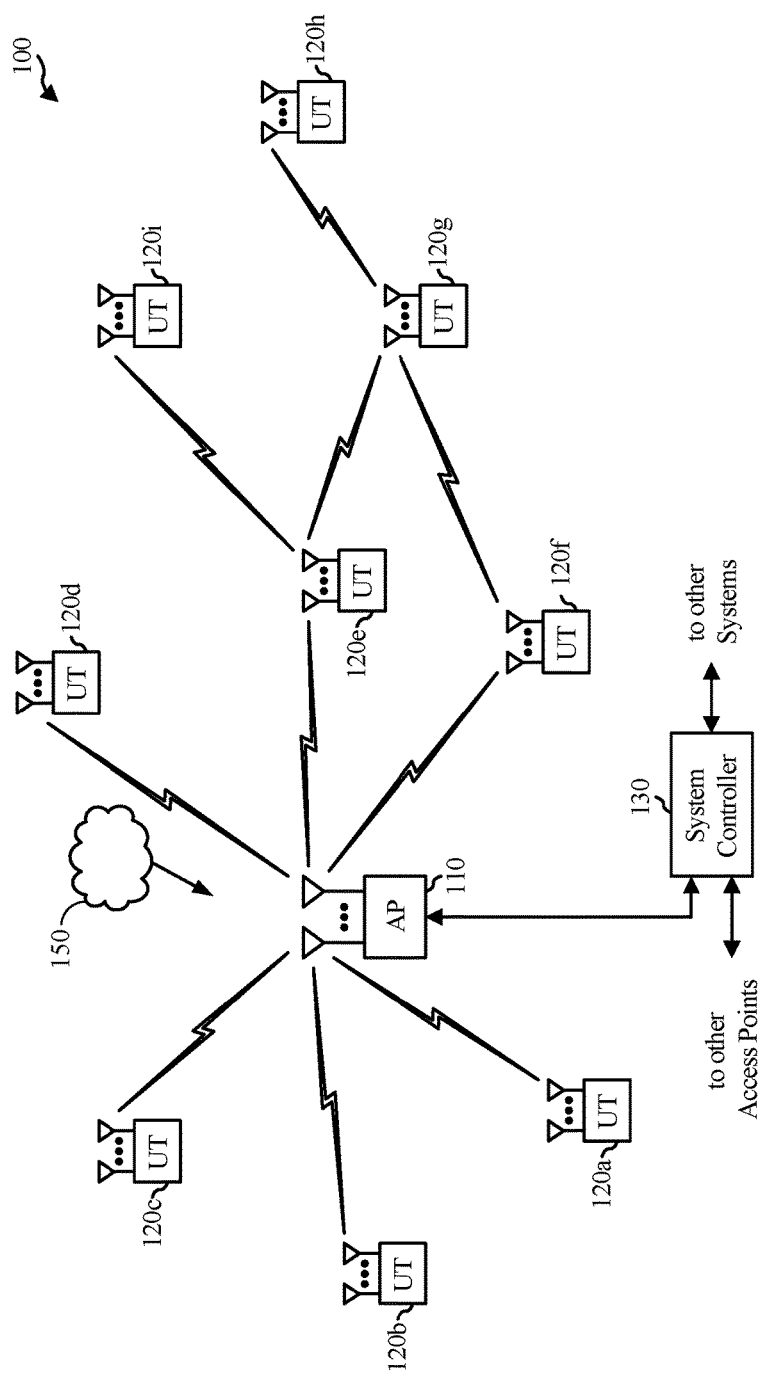
FIG. 1 is a diagram of an example wireless communications network, in accordance with certain aspects of the present disclosure.

Certain aspects of the present disclosure provide methods and apparatus for utilizing frames with beamforming training fields with long base sequences. The sequence length may be based on a lengthening factor, for example, signaled in a preamble portion of the frames.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, a wireless station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point (AP) is generally a fixed station that communicates with the user terminals and may also be referred to as a base station, a wireless device, or some other terminology. A user terminal may be fixed or mobile and may also be referred to as a mobile station, a wireless device, or some other terminology. In one or more cases, an access terminal (AT) may be referred to as a wireless device.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals may have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost may be supported). The system 100 may also be a TDMA system if the user terminals 120 share the same frequency channel by dividing transmission/reception into different time slots, each time slot being assigned to different user terminal 120.

Figure 2:
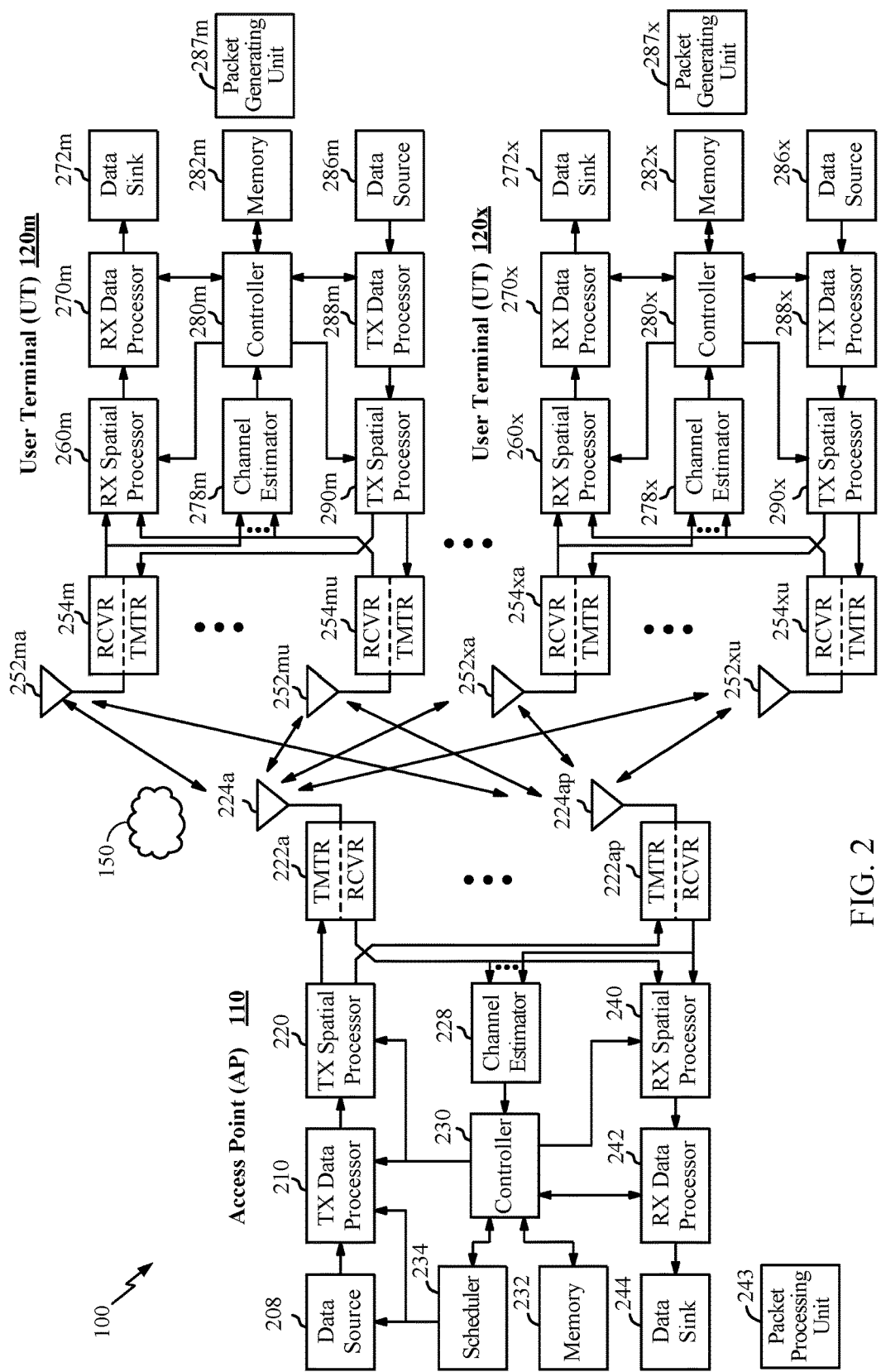
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dm,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-3B), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 10-13, 15, and 16).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

Example Frame Using Channel Bonding (CB) and Including a Training (TRN) Field

Figure 3:
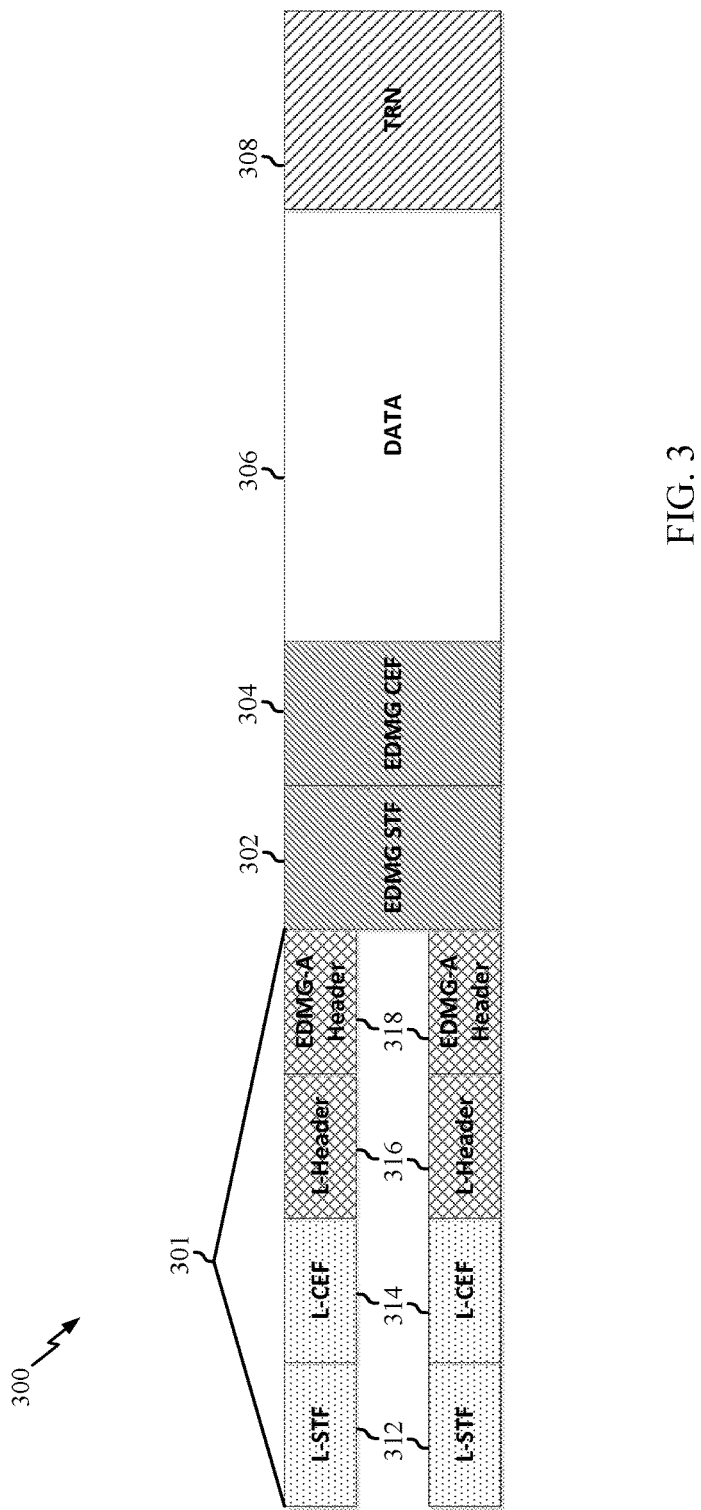
FIG. 3 illustrates an example frame format with a beamforming training field.

FIG. 3 illustrates an example frame 300, in accordance with IEEE 802.11ay using Channel Bonding (CB) of 2 and including the TRN field 308 at the end of the packet.

As illustrated, the frame 300 may have a preamble (header) structure 301 for channel bonding (or aggregation) of at two channels and the frame may have an enhanced directional multi-gigabit (EDMG) short training field (STF) 302 and EDMG channel estimation field (CEF) 304, which may be constructed with Golay code sequences, a data payload 306, and training (TRN) field 308. The header may include fields transmitted on each bonded channel, such as an L-STF field 312, L-CEF field 314, L-Header 316, and an EDMG-A header 318. The "L" in labels L-STF 312, L-CEF 314, and L-Header 316 indicate these fields may all be recognizable by "legacy" devices and, thus, promote interoperability.

The 802.11ay standard for 60 GHz communication that is under development in the 802.11 working group under task group TGay may be considered an enhancement of the existing 802.11TGad (DMG-Directional Multi-Gigabit) standard. This standard may increase the physical layer (PHY) throughput in 60 GHz by using methods such as MIMO and channel bonding/channel aggregation. In general, the difference between channel bonding and channel aggregation is that in channel bonding a wider channel is created while in channel aggregation multiple standard bandwidth channels are used together.

The packet structure for EDMG typically includes a preamble (L-STF, L-CEF), a legacy header for compatibility, an EDMG-A header (Enhanced DMG) EDMG training fields (EDMG STF, EDMG CEF) and then EDMG (1 lay modulation) data. Most of the EDMG frames may include TRN fields at the end of the frame. These TRN fields may be transmitted separately on each of the bonded channels or on the full bonded bandwidth.

The standard will also support MIMO configurations, for example, of up to 8 spatial streams and up to 4 channels in aggregation. In theory, each of these spatial streams may have a different MCS (Modulation & Coding Scheme). In some cases, the EDMG-A header has 112 bits for indicating features, many of which are used for purposes other than signaling MCS for different spatial streams. A challenge is thus presented in how to indicate the MCS for the different MIMO streams and different channels in aggregation in an efficient manner.

The standard will also support MIMO configurations, SU-MIMO and MU-MIMO, for example, of up to 8 spatial streams and up to 4 channels in aggregation. In this case the TRN fields may be transmitted sequentially from each transmitting chain as transmitted in SISO mode, or by using orthogonal Golay sequences transmitted from all transmitting chain in MIMO mode.

Example Long Sequences for Beamforming Training (TRN) Fields

Certain aspects of the present disclosure provide methods and apparatus for using frames having beamforming training fields with base complementary code sequences that have a longer length than complementary code sequences used in other fields of the frame. The longer length may help perform channel estimation when encountering longer delay spread, for example, due to multipath effects of multiple beams during a beamforming training procedure. The longer length may be based on a lengthening factor (e.g., ×2 or ×4) which may be signaled, for example, using one or more bits of a preamble portion of the frames.

Existing 802.11ad TRN field sequences are based on complementary (Golay) code sequences using sequences with length similar to these used in STF and CEF fields. The 802.11ay standard will support Channel Bonding (CB) of 2, 3, or 4 channels and MIMO. As part of the development of 11ay the TRN field sequences may be adjusted to the CB and a new TRN frame formats may also be considered. However, all current options are based on Golay sequences with a same time duration as in 11ad. This means, for example, that with CB=1 the base Golay sequence length is 128, in CB=2, their length is 256, in CB=3 their length is 384, and in CB=4 their length is 512. This length is suitable to maximum delay spread of 36.4 μsec (e.g., 64 chip length in CB=1).

One challenge is that while such a length is suitable for channels up to 64 chip length (in CB=1), such a length may not be suitable for longer channels (channels with longer delay spread). Because 802.11ay may also support longer channels up to 128 (CB=1), with a long guard interval (GI), the Golay length in the TRN may not be sufficient any more. In addition, the TRN fields (or simply TRNs) may be used in cases where the receiver is in a quasi-omni antenna mode. A quasi-omni antenna mode may include a receiver that has antennas set to receive over a relatively wide beam-width but with low antenna gain. When in the quasi-omni antenna mode the channel may be longer than the channel seen during data transactions that use beamformed antennas, for example, due to multi-path of different beams.

Aspects of the present disclosure, however, provide training fields with longer Golay sequences that may help accommodate such channel conditions with longer delay spread.

Figure 4:
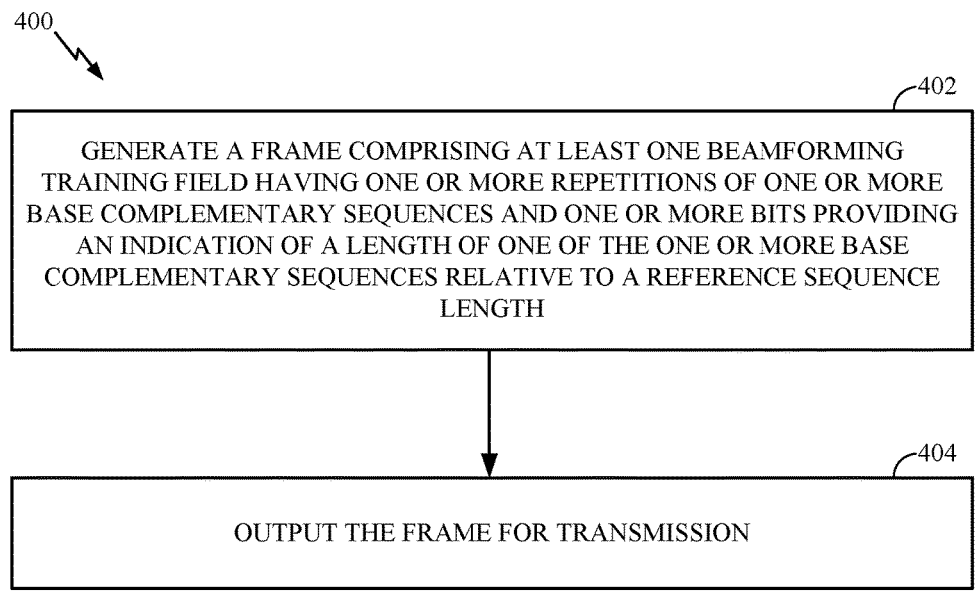
FIG. 4 illustrates example operations for generating a frame with a beamforming training field, in accordance with certain aspects of the present disclosure.

FIG. 4 illustrates example operations 400 for generating a frame (e.g., an EDMG frame) with a beamforming training field with long base code sequences, in accordance with certain aspects of the present disclosure. The operations 400 begin, at 402, by generating a frame including at least one beamforming training field having one or more repetitions of one or more base complementary sequences and one or more bits providing an indication of a length of one of the one or more base complementary sequences relative to a reference sequence length. In one or more cases the one or more base complementary sequences may include base Golay sequences. At 404, the frame is output for transmission.

In one or more cases, the indication may include a lengthening factor. Further, the length may be a function of the reference sequence length and the lengthening factor. In some cases, one value of the lengthening factor results in the length of the one or more base complementary sequences and the reference sequence length being the same.

Figure 5:
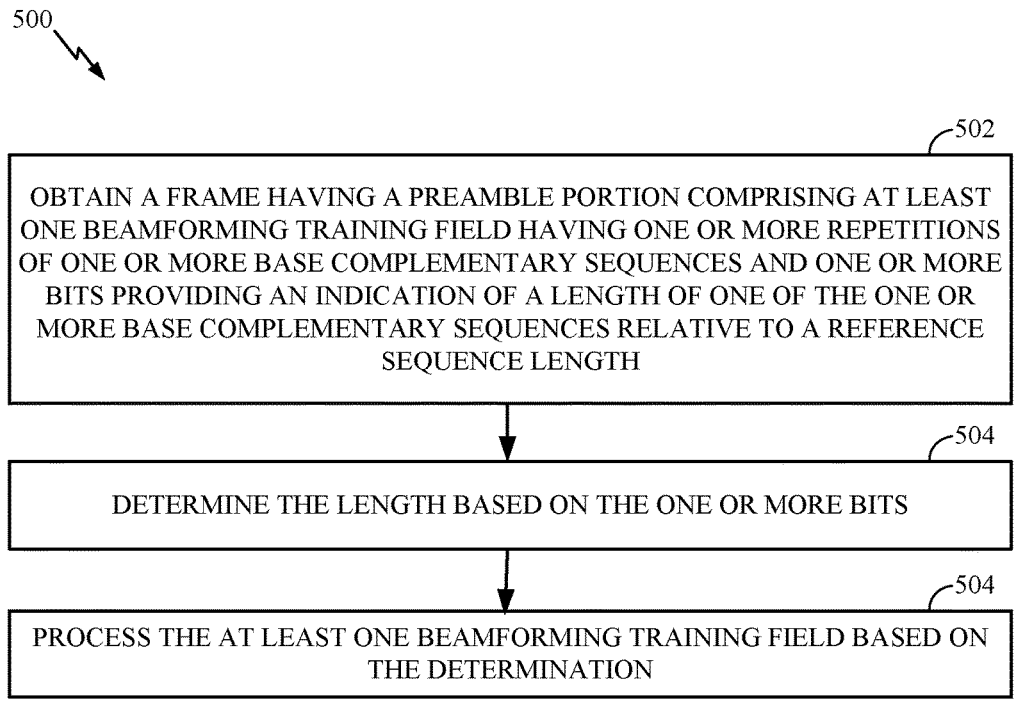
FIG. 5 illustrates example operations for processing a frame with a beamforming training field, in accordance with certain aspects of the present disclosure.

FIG. 5 illustrates example operations 500 for processing a frame with training fields with long base code sequences, in accordance with certain aspects of the present disclosure. In other words, the operations may be considered complementary to operations 400 and may be performed by a device receiving a frame generated and transmitted in accordance with operations 400.

Operations 500 begin, at 502, by obtaining a frame having a preamble portion comprising at least one beamforming training field having one or more repetitions of one or more base complementary sequences and one or more bits providing an indication of a length of one of the one or more base complementary sequences relative to a reference sequence length. At 504, the station determines the length based on the one or more bits. At 506, the station processes the at least one beamforming training field based on the determination.

As described above, in some cases, code sequence lengths scale with channel bonding. For example, with CB=2, sequence lengths may scale by 2. Unfortunately, if base code sequences (e.g., defined in 802.11ad) are kept the same, this may not be sufficient for larger delay spreads. For example, Golay 128 based codes may be suitable for a channel that has 64 chip delay spread, but not longer channels.

Therefore, aspects of the present disclosure provide frames that utilize a lengthening factor applied to base sequences in beamforming training fields. For example, such lengthening factors may be ×1 (standard length), ×2 (twice as long), and ×4 (four times as long). Using lengthened base sequences, in effect, results in a larger base sequence or "atomic unit" used for constructing a training field.

Using longer base sequences in beamforming training fields in this manner may be applied in any TRN field type format (regardless of the number of base Golay codes used in the TRN field). Lengthening in this manner may also be applied to single carrier (SC) or OFDM and also single input-single output (SISO) or multiple input-multiple output (MIMO) transmissions.

In some cases, a conventionally designed Golay sequence may be replaced by a longer sequence that is, for example, twice or quadruple the current designed length. In some cases, these sequences may be already defined. Particularly, sequences may keep a same format (which may apply to either the 11ad like or the new one) and may replace the Ga, −Ga, Gb, and −Gb sequences with a same type of sequence but longer by a factor such as, for example, 2 or 4. For example, when CB=2 the Golay sequences (Ga, −Ga, Gb and −Gb) are of length 256. For a lengthening factor of 2, sequences of 512 may be used, and for a lengthening factor of 4, sequences of 1024 may be used.

In some cases, the transmitter may signal the lengthening factor (e.g., ×1, ×2, or ×4) using bits in a preamble portion. For example, the lengthening factor may be signaled using 2 bits in an enhanced directional Multi-Gigabit (EDMG) header such as an EDMG Header-A. In some cases, a lengthening factor of 1 results in the default and the current designed TRNs.

In current standards, regardless of the channel bonding value (e.g., for CB=2, 3, and 4), legacy fields (L-STF and L-CEF) are based on Golay sequences of a fixed length (of 128) to maintain backward-compatibility with 802.11ad, while EDMG fields (EDMG-STF and EDMG-CEF) are based on Golay sequences with a length that varies with the channel bonding value (128*CB). Thus, in the case of CB=1, these fields are all based on a Golay length of 128 and, if present, EDMG-STF and EDMG-CEF use the same base Golay length as L-STF and L-CEF.

Aspects of the present disclosure, however, allow training fields (TRN) to use still further lengthened Golay sequence lengths, relative to the CB used for the TRN fields.

As described above, TRN fields may be transmitted over the entire bonded bandwidth (e.g., for CB=2, the TRNs may be sent over both channels as one "wideband" channel). In this case, the lengthening factor may be considered relative to the Golay length in the EDMG STF and EDMG CEF.

TRN fields may also be transmitted separately on each bonded channel (e.g., in the case of CB=2, each TRN field may be sent over a single channel of the two channels). In this case, the lengthening factor may be considered relative to the Golay length in the L-STF and L-CEF.

Rather than basing the TRN field base Golay length on the number of channels each are sent over (e.g., 1 channel it is 128, 2 channels it is 256, 3 channels 384, 4 channels 512), aspects of the present disclosure allow extension of the TRN fields base Golay sequences length by the lengthening factor relative to a "channel#-dependent" base Golay length.

FIGS. 6A-6D illustrate examples of this extended lengthening, with different lengthening factors that may be signaled with two bits and the corresponding base Golay code length, for different channel bonding values. The example in FIG. 6A assumes a channel bonding of CB=1, such that a lengthening value of 2 results in a lengthened base code sequence length of 256, while a lengthening value of 4 results in a lengthened base code sequence length of 512. The example in FIG. 6B assumes a channel bonding of CB=2, such that a lengthening value of 2 results in a lengthened base code sequence length of 512, while a lengthening value of 4 results in a lengthened base code sequence length of 1024. Other values may be determined for other channel bonding values. For example, as illustrated in FIG. 6C, for CB=3, the values shown for CB=1 may be tripled, while as illustrated in FIG. 6D, for CB=4, the illustrated values for CB=2 may be doubled.

In some cases, the negotiation of the lengthening factor may be added mainly to a beam refinement phase (BRP) protocol and/or any other protocol that may request TRNs. For example, one some cases a processing system may be configured to determine a length of one or more base complementary sequences during a beam refinement phase (BRP) of a beam training procedure performed with a wireless device. In some cases, the processing system may be configured to determine a length of the one or more base complementary sequences based on a capability of a wireless device.

Figure 4A:
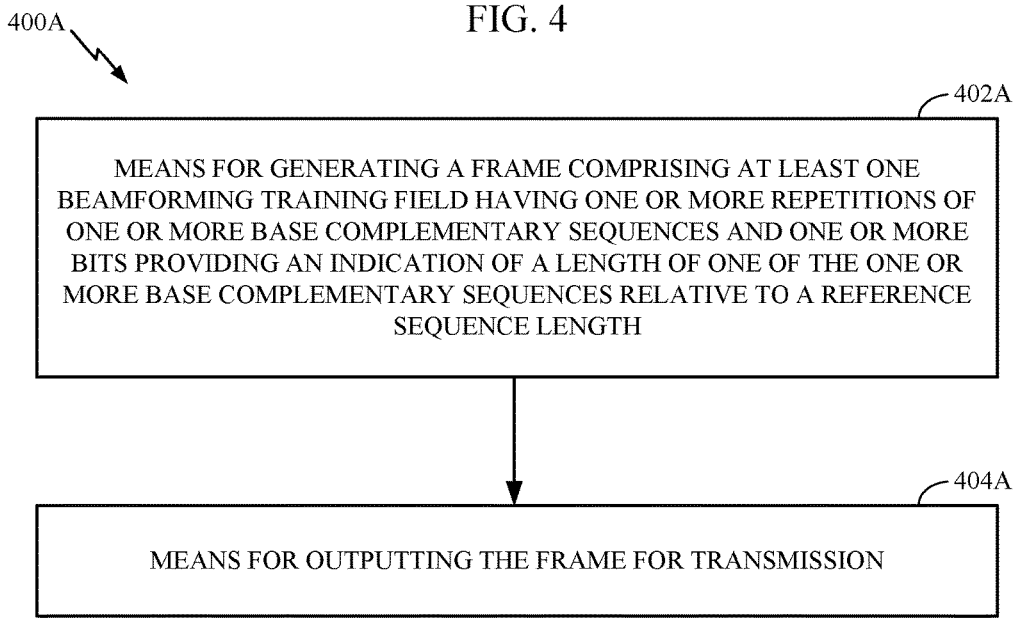
FIG. 4A illustrates example components capable of performing the operations shown in FIG. 4, in accordance with certain aspects of the present disclosure.
Figure 5A:
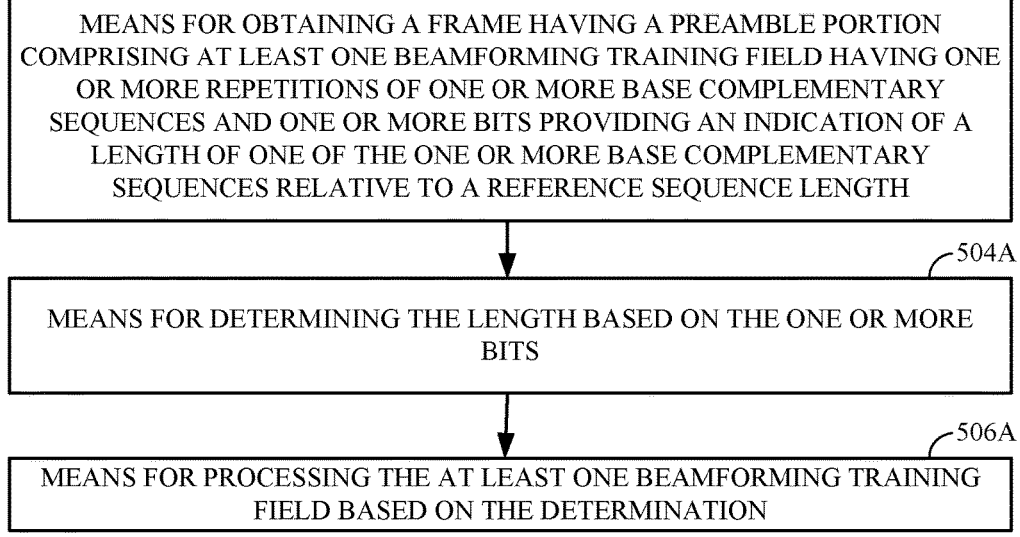
FIG. 5A illustrates example components capable of performing the operations shown in FIG. 5, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A while operations 500 illustrated in FIG. 5 correspond to means 500A illustrated in FIG. 5A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for obtaining, means for generating, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame, a device may have an interface to output a frame for transmission (a means for outputting). For example, a processor may output a frame, via a bus interface, to a radio frequency (RF) front end for transmission. In some cases an apparatus for wireless communication may include a first interface for obtaining a frame having a preamble portion. The preamble portion may include at least one beamforming training field having one or more repetitions of one or more base complementary sequences, and one or more bits providing an indication of a length of one of the one or more base complementary sequences relative to a reference sequence length. The apparatus may further include a processing system configured to determine the length based on the one or more bits. The processing system may also be configured to process the at least one beamforming training field based on the determination.

Similarly, rather than actually receiving a frame, a device may have an interface to obtain a frame received from another device (a means for obtaining). For example, a processor may obtain (or receive) a frame, via a bus interface, from an RF front end for reception. In some cases, the processing system may be configured to generate a request frame to request the length. Further, the apparatus may include a second interface to output the request frame for transmission to a wireless device during a beam refinement phase (BRP) of a beam training procedure performed with the wireless device.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium.

Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a processing system configured to generate a frame comprising:
one or more fields containing a first base complementary sequence having a first length;
a body region comprising a beamforming training field comprising a second base complementary sequence having a second length, wherein the second base complementary sequence comprises one or more repetitions of the first base complementary sequence; and
a preamble region comprising one or more bits providing an indication of the second length relative to the first length; and
an interface configured to output the frame for transmission.

2. The apparatus of claim 1, wherein the first base complementary sequence comprises a Golay sequence.

3. The apparatus of claim 1, wherein the first length is based on a channel bonding value.

4. The apparatus of claim 1, wherein the indication of the second length comprises a lengthening factor, and wherein the second length is a function of the first length and the lengthening factor.

5. The apparatus of claim 4, wherein:
a first lengthening factor is indicative of the second length being equal to the first length; and
a second lengthening factor is indicative of the second length being two or more times the first length.

6. The apparatus of claim 1, wherein the indication of the second length comprises one or more bits of an enhanced directional multi-gigabit (EDMG) header field of the preamble region of the frame.

7. The apparatus of claim 1, wherein the processing system is further configured to determine the second length of the second base complementary sequence during a beam refinement phase (BRP) of a beam training procedure performed with a wireless device.

8. The apparatus of claim 1, wherein the processing system is further configured to determine the second length of the second base complementary sequence based on a capability of a wireless device.

9. An apparatus for wireless communication, comprising:
a first interface for obtaining a frame, the frame comprising:
one or more fields containing a first base complementary sequence having a first length;
a body region comprising a beamforming training field comprising the second base complementary sequence having a second length, wherein the second base complementary sequence comprises one or more repetitions of the first base complementary sequence; and
a preamble region comprising one or more bits providing an indication of the second length relative to the first length; and
a processing system configured to:
determine the second length based on the indication of the second length, and
process the beamforming training field based on the determination.

10. The apparatus of claim 9, wherein the first base complementary sequence comprises a Golay sequence.

11. The apparatus of claim 9, wherein:
the indication comprises a lengthening factor; and
the second length is a function of the first length and the lengthening factor.

12. The apparatus of claim 11, wherein:
a first lengthening factor is indicative of the second length being equal to the first length; and
a second lengthening factor is indicative of the second length being two or more times the first length.

13. The apparatus of claim 9, wherein the indication of the second length comprises one or more bits included in an enhanced directional Multi-Gigabit (EDMG) header field of the preamble region of the frame.

14. The apparatus of claim 9, further comprising at least one antenna via which the frame is obtained, wherein the apparatus is configured as a wireless station.

15. A wireless station, comprising:
a processing system configured to generate a frame comprising:
one or more fields containing a first base complementary sequence having a first length;
a body region comprising a beamforming training field comprising a second base complementary sequence having a second length, wherein the second base complementary sequence comprises one or more repetitions of the first base complementary sequence; and a preamble region comprising one or more bits providing an indication of the second length relative to the first length; and a transmitter configured to transmit the frame.

* * * * *